United States Patent
Sato et al.

(10) Patent No.: US 6,629,619 B2
(45) Date of Patent: Oct. 7, 2003

(54) WATERPROOF STRUCTURE OF ELECTRICAL JUNCTION BOX

(75) Inventors: Hidetoshi Sato, Shizuoka (JP); Yoshio Matsui, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/410,063

(22) Filed: Oct. 1, 1999

(65) Prior Publication Data

US 2002/0084271 A1 Jul. 4, 2002

(30) Foreign Application Priority Data

Oct. 1, 1998 (JP) .......................................... 10-279516

(51) Int. Cl.[7] .............................. B65D 6/28; H02G 3/14
(52) U.S. Cl. ...................... 220/4.02; 220/3.8; 220/3.94; 220/4.21; 220/378
(58) Field of Search ............................... 220/4.02, 3.2, 220/3.8, 3.92, 3.94, 4.01, 4.21, 4.24, 323, 324, 326, 806, 378, 3.3, 3.4, 3.5, 3.6, 3.7, 3.9; 174/50, 52.3, 17 CT, 17 R; 361/641

(56) References Cited

U.S. PATENT DOCUMENTS

| | | | | |
|---|---|---|---|---|
| 3,599,826 A | * | 8/1971 | Rocher | 220/324 X |
| 3,696,962 A | * | 10/1972 | Fehres et al. | 220/319 |
| 4,034,889 A | * | 7/1977 | Hammes et al. | 220/324 X |
| 5,390,811 A | * | 2/1995 | Ogino et al. | 220/326 |
| 5,532,431 A | * | 7/1996 | Saka et al. | 174/52.3 |
| 5,574,254 A | * | 11/1996 | Mori et al. | 174/52.3 |
| 5,887,744 A | * | 3/1999 | Mejias | 220/324 X |
| 6,006,942 A | * | 12/1999 | Morris, Sr. et al. | 220/326 X |

* cited by examiner

Primary Examiner—Lee Young
Assistant Examiner—Niki M. Eloshway
(74) Attorney, Agent, or Firm—Sughrue Mion, PLLC

(57) ABSTRACT

In a waterproof structure of an electrical junction box which renders the electrical junction box waterproof by bringing a stepped section 16 of a cover 2 into contact with a flange section 21 of a case 3, a protuberance 23 to be brought into pressing contact with the stepped section or the flange section is formed along the periphery of the stepped section 16 or the flange section 21. In order to provide effective sealing, the leading edge of the protuberance 23 is brought into line contact with the flange section 21 or the stepped section 16. Further, a skirt wall 13 is formed so as to extend downwardly from the stepped section 16, and a second skirt wall 22 is formed so as to extend from the flange section 21 along the skirt wall 13.

3 Claims, 4 Drawing Sheets

WATERPROOF STRUCTURE OF ELECTRICAL JUNCTION BOX

BACKGROUND OF THE INVENTION

1. Field of the Invention

The present invention relates to a waterproof structure of an electrical junction box which is to be mounted on a vehicle and prevents entry of water through a clearance between a cover and a case of the electrical junction box.

2. Related Art

FIGS. 6 and 7 show a conventional waterproof structure of an electrical junction box (see Unexamined Japanese Patent Application Hei-8-288667).

In FIG. 6, reference numeral 30 designates a cover formed from synthetic resin; 31 designates a waterproof packing; and 32 designates a case formed from synthetic resin. A relay connection section 33, principally, is housed within the case 32. An electrical junction box 34 is a generic name for a relay box, an unillustrated fuse box, or an unillustrated junction box. Resilient lock members 35, each paired with a lock frame section 36, are provided on opposite sides of the electrical junction box 34, thereby locking together the cover 30 and the case 32.

A recess 37 (see FIG. 7) for receiving the waterproof packing 31 is formed along and over the entire outer peripheral lower edge of a skirt section of the cover 30. The recess 37 is defined by an exterior hood wall 38 and an interior elongated wall 39 (see FIG. 7). When the waterproof packing 31 is fitted into the recess 37 and the cover 30 is placed on the case 32, an upper end 40 of the case 32 is brought into pressing contact with the waterproof packing 31, thus materializing primary waterproof sealing.

A stepped section 41 (see FIG. 7) is formed along the skirt section of the hood wall 38 of the cover 30. A flange section 42 to be brought into contact with the stepped section 41 is projectingly formed along the case 32. When the cover 30 is placed on the case 32, the stepped section 41 is brought into contact with the flange section 42, thus materializing secondary waterproof sealing of the electrical junction box 34 (see FIG. 6). The electrical junction box 34, which houses electronic devices susceptible to water or dusts, requires a double-waterproof structure.

In the above-described conventional structure of the electrical junction box, the stepped section 41 of the cover 30 is in plane contact with the flange section 42 of the case 32. Hence, the contact is effected by weak forces. For example, if the cover 30 is slightly warped, a horizontal clearance will arise between the stepped section 41 and the flange section 42, thus resulting in a fear of water or dusts entering the waterproof packing 31.

A vertical clearance 44 arises between the flange section 42 and the interior surface of a skirt wall 43 continuing from the stepped section 41. There is apprehension that, for example, when the electrical junction box is exposed to high-pressure water at the time of engine cleaning, the water easily breaks through the secondary waterproof mechanism (materialized by the stepped section 41 and the flange section 42) and reaches the waterproof packing 31 by way of the vertical clearance 44. However, the vertical clearance 44 is important for smooth fitting of the cover 30 to the case 32.

The present invention has been conceived in view of the foregoing problem, and the object of the present invention is to provide a waterproof structure of an electrical junction box which is improved in preventing entry of water and dust into the electrical junction box by way of a clearance between a stepped section of a cover and a flange section of a case, and which can prevent entry of high-pressure water into the electrical junction box by way of a clearance between a skirt wall of the cover and the flange section of the case.

SUMMARY OF INVENTION

To achieve the object, the present invention provides a waterproof structure of an electrical junction box which renders the electrical junction box waterproof by bringing a stepped section of a cover into contact with a flange section of a case, wherein a protuberance to be brought into pressing contact with the stepped section or the flange section is formed along the periphery of the stepped section or the flange section.

Preferably, the leading edge of the protuberance is brought into line contact with the flange section or the stepped section in order to provide effective sealing.

Further, preferably, in order to provide effective sealing, a skirt wall is formed so as to extend downwardly from the stepped section, and a second skirt wall is formed so as to extend from the flange section along the skirt wall.

DETAILED DESCRIPTION OF THE PREFERRED EMBODIMENTS

A specific example according to a first embodiment of the present invention will be described hereinbelow by reference to the accompanying drawings.

FIGS. 1 through 4 show one embodiment of a waterproof structure of an electrical junction box according to the present invention.

Figure 1:
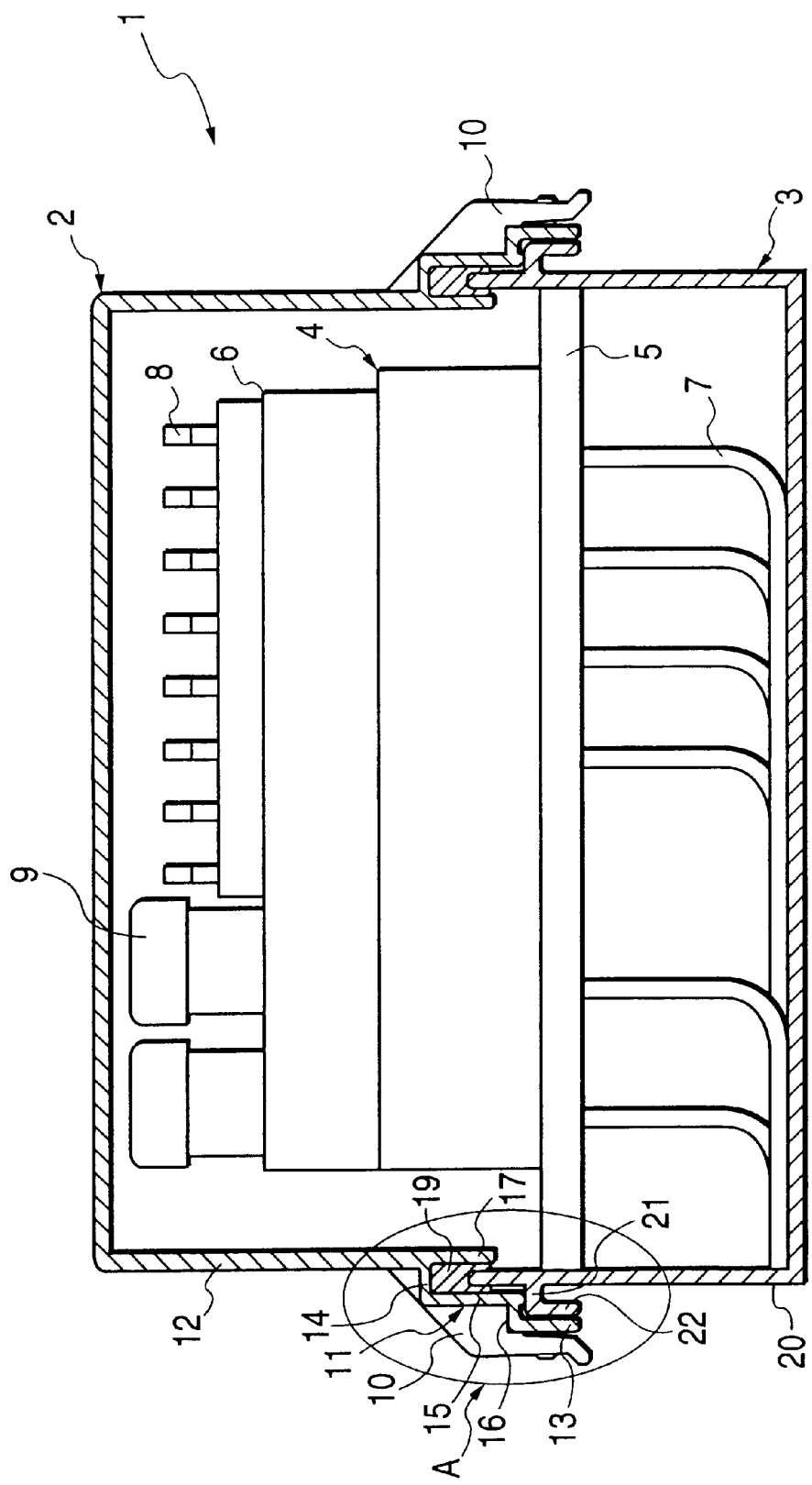
FIG. 1 is a longitudinal cross-sectional view showing an electrical junction box.
Figure 2:
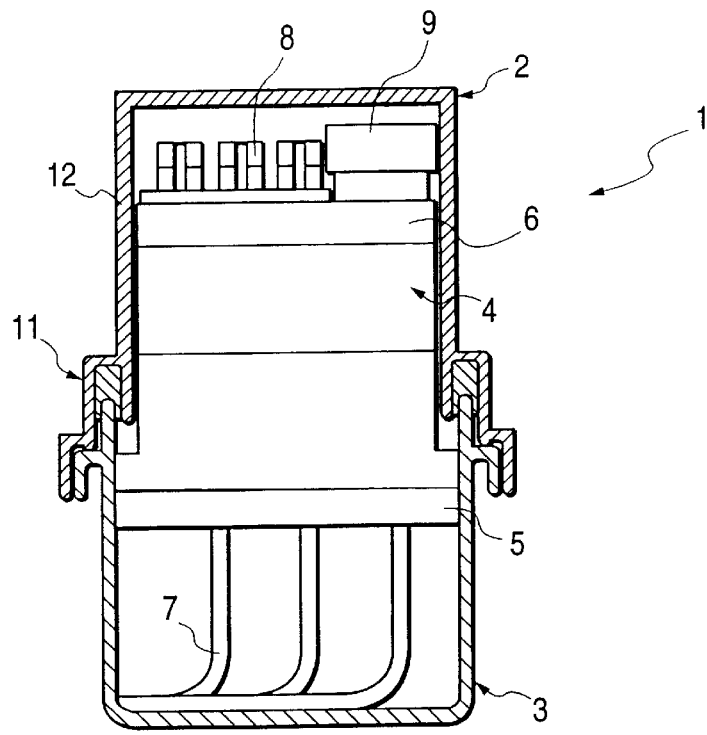
FIG. 2 is a lateral cross-sectional view of the electrical junction box.

In FIGS. 1 and 2, reference numeral 1 designates an electrical junction box; 2 designates a cover formed from synthetic resin; and 3 designates a case formed from synthetic resin. A substrate section 5 of a junction box body section 4 is housed in the case 3. A fuse connection section 6 of the junction box body section 4 is covered by means of placing the cover 2 on the case 3. Wires 7 are led from the substrate section 5 to the interior space of the case 3 and are led out of the case 3 by way of an unillustrated waterproof grommet. Small-sized fuses 8 and a fusible link 9 are connected to the fuse connection section 6.

Figure 3:
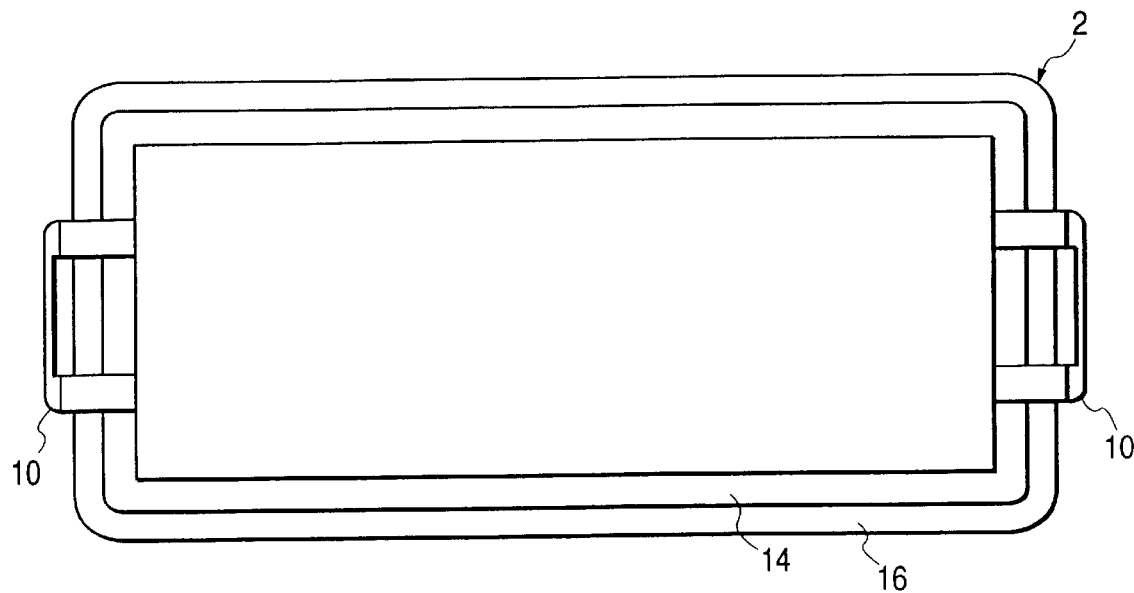
FIG. 3 is a plan view showing the electrical junction box.
Figure 6:
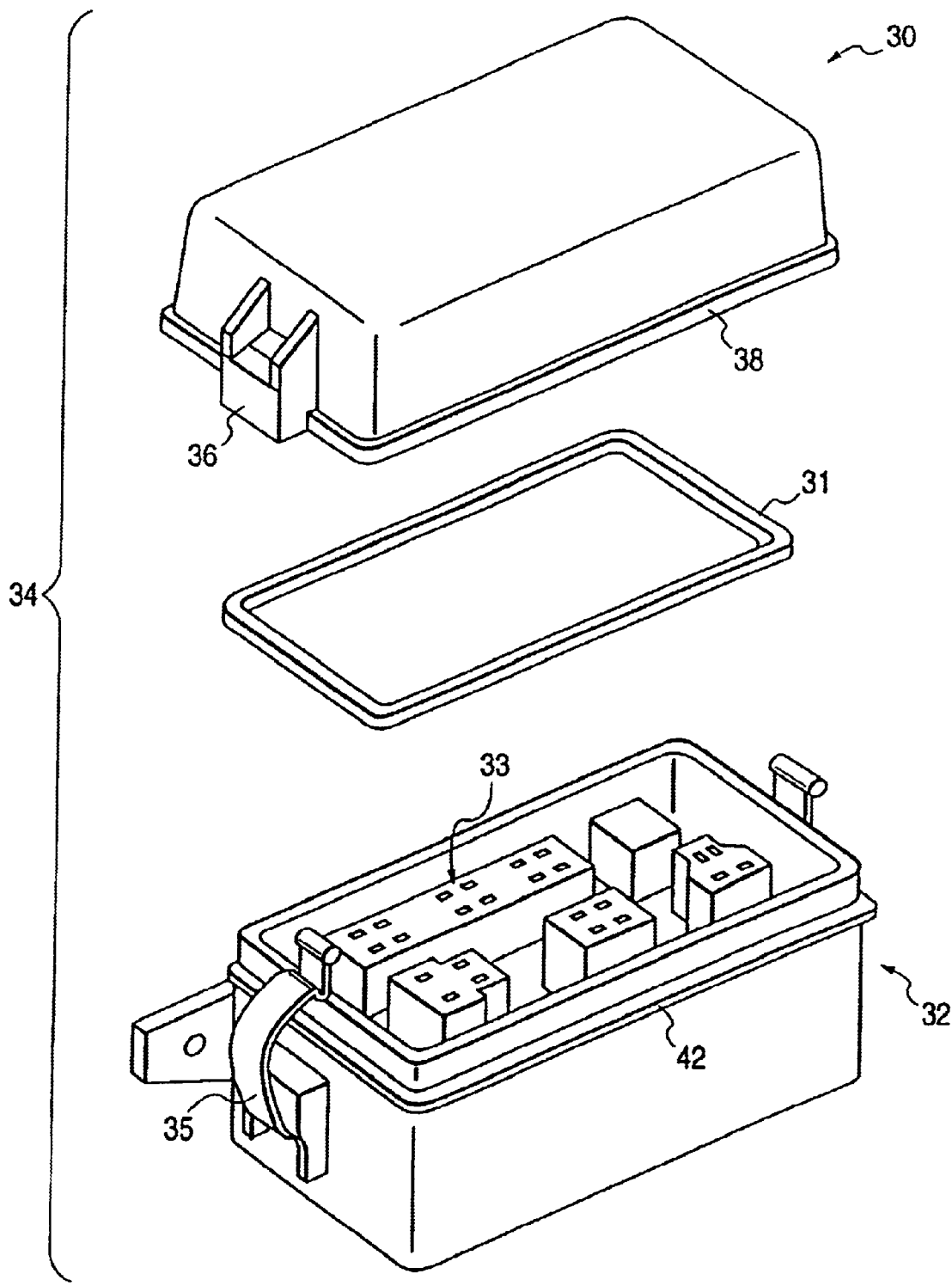
FIG. 6 is an exploded perspective view showing a conventional electrical junction box.

As shown in FIGS. 1 and 3, a lock frame section 10 is provided on opposite longitudinal ends of the cover 2, and elastic lock members (analogous to the lock members designated by 35 in FIG. 6), each to be engaged with the lock frame section 10, are attached to opposite longitudinal ends of the case 3 shown in FIG. 1.

Figure 7:
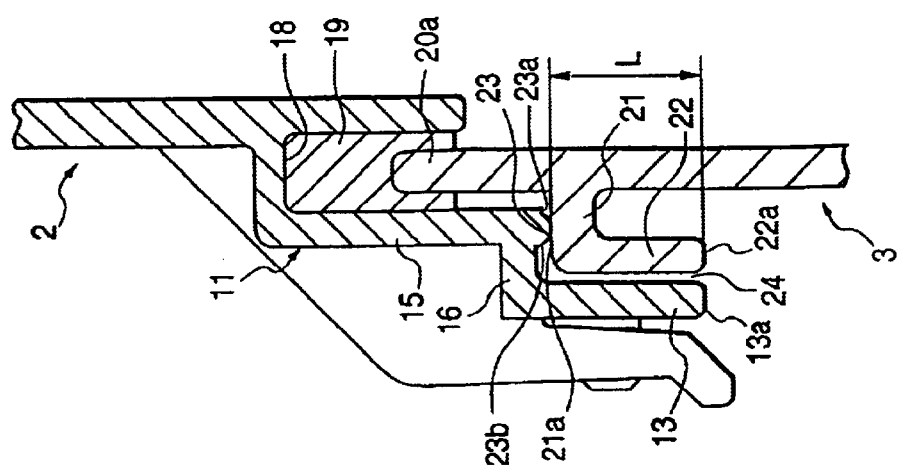
FIG. 7 is a longitudinal cross-sectional view showing the principal elements of a conventional waterproof structure of an electrical junction box.

A hood wall 11 is formed over the entire outer peripheral lower edge of a skirt section of the cover 2. The hood wall 11 has a two-stepped structure and is attached to the exterior of a peripheral wall 12 of the cover 2 so as to extend to the outside. A lower (second) skirt wall 13 is formed so as to extend downward further than does the skirt wall 43 of the conventional electrical junction box shown in FIG. 7.

The hood wall 11 is substantially composed of an upper wall 14 horizontally projecting from the peripheral wall 12; a vertical wall 15 formed so as to downwardly extend from the upper wall 14 at right angles; a stepped wall (stepped section) 16 horizontally projecting from the lower edge of the vertical wall 15; and the skirt wall 13 extending from the stepped wall 16 so as to extend downward at right angles. The lock frame section 10 is formed so as to extend from the hood wall 11 to the peripheral wall 12, thus increasing the rigidity of the hood wall 11. An elongated wall 17 is downwardly formed in plane with the lower edge of the peripheral wall 12 and faces the vertical wall 15. A waterproof packing 19 is fitted into a recess 18 (see FIG. 4) defined by the vertical wall 15, the upper wall 14, and the elongated wall 17.

An upper edge 20*a* of the peripheral wall 20 of the case 3 is brought into pressing contact with the waterproof packing 19, thus materializing primary waterproof sealing. A flange wall (flange section) 21 is formed so as to outwardly project from the peripheral wall 20 of the case 3. A second skirt wall 22 is formed at the leading edge of the flange wall 21 so as to downwardly extend at right angles, in parallel with and inward of the skirt wall 13. The second skirt wall 22 and the flange wall 21 assume an inverted L-shaped cross section and are formed along the entire circumference of the case 3.

Figure 4:
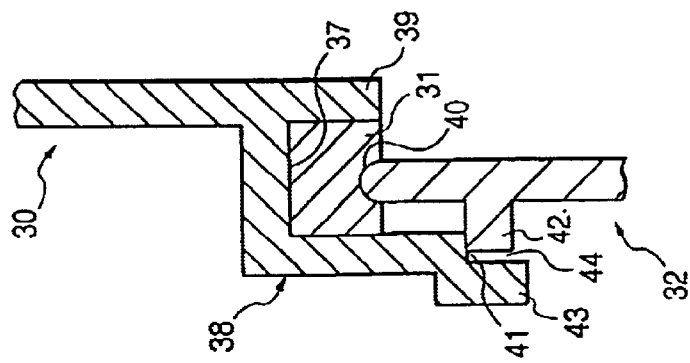
FIG. 4 is an enlarged view of section A shown in FIG. 1, showing a waterproof structure of the electrical junction box.

FIG. 4 is an enlarged view of section A shown in FIG. 1. As can be seen from the drawing, a protuberance 23 to be used when the hood wall 11 of the cover 2 is brought into pressing contact with the flange wall 21 of the case 3 is formed on and along the entire periphery of the lower surface of the stepped wall 16 of the hood wall 11 of the cover 2. In the present embodiment, the portion of the protuberance 23 facing the inside of the electrical junction box is formed into a tapered surface 23*a* to be used for allowing smooth insertion of the waterproof packing 19 into the recess 18. By virtue of the presence of the tapered surface 23*a*, the area over which the protuberance 23 is in contact with the upper surface 21*a* of the flange wall 21 is reduced.

The protuberance 23 is in substantially line contact with the flange wall 21, thus exerting a strong pressing force (contact force). The portion of the protuberance 23 facing the outside is not formed into a tapered surface (23*a*), and a side surface 23*b* of the protuberance 23 reliably prevents entry of water or dusts. In other words, the protuberance 23 acts as a barrier against water or dusts.

The skirt wall 13 of the hood wall 11 and the second skirt wall 22 of the case 3 are formed so as to extend far downwardly, and a long, narrow clearance 24 of size L is formed between the skirt wall 13 and the second skirt wall 22. The long, narrow clearance 24 weakens the force of high-pressure water used for cleansing the engine, and the momentum of the water is diminished until the water reaches the protuberance 23. If low pressure is applied to water, the water naturally drops from the clearance 24 before reaching the protuberance 23. As a result, entry of water into the waterproof packing 19 from the protuberance 23 is reliably prevented, thus improving the waterproof characteristic of the electrical junction box 1 to a great extent.

The lengths of the skirt walls 13 and 22; i.e., the length L of the clearance 24, are preferably as large as possible. If the length L is short, there is yielded a waterproof effect greater than that yielded by the conventional structure of the electrical junction box, so long as the lower skirt wall 13 downwardly projects slightly beyond the second skirt wall 22. The edge 13*a* of the skirt wall 13 must be flush with the edge 22*a* of the skirt wall 22. In the conventional junction box, if there is a difference in length between the skirt wall 43 and the flange section 42, as in the case of the conventional structure shown in FIG. 7, the area of the clearance 44 is increased, so that water more easily enters the clearance 44. Although from the viewpoint of securing a reliable waterproof seal the clearance 24 is preferably as narrow as possible, the size of the clearance 24 is determined on the basis of a trade-off between the difficulty of water entering into the clearance 24 and the ease of the cover 2 being fitted to the case 3.

Figure 5:
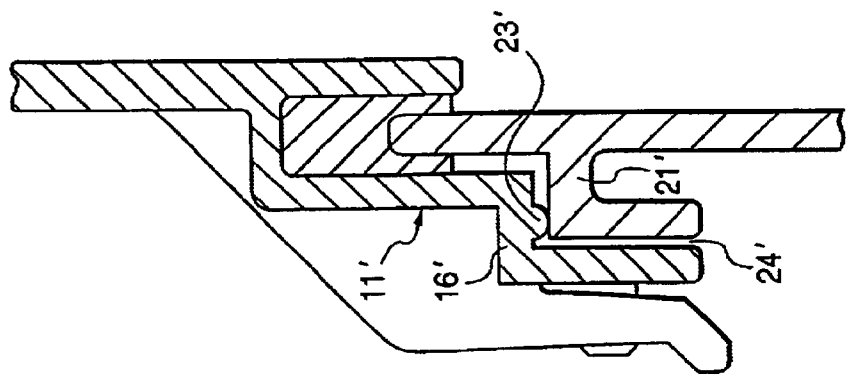
FIG. 5 is an enlarged cross-sectional view showing another embodiment of a protuberance of the waterproof structure.

FIG. 5 shows a second embodiment wherein a protuberance 23' to be used for pressing action, the protuberance 23' being situated in the vicinity of a clearance 24' and assuming a rounded geometry or a geometry such that its longitudinal cross-section assumes a semi-circular shape. The protuberance 23' is situated in the intermediate position of a stepped wall (stepped section 16' of a hood wall 11'. Since the protuberance 23' assumes a rounded geometry, the area over which the protuberance 23' maintains contact with a flange wall (flange section) 21' becomes smaller than the corresponding area in the first embodiment. By means of line contact, the pressing force exerted on the flange wall 21' is increased greatly, thus enhancing the waterproof effect of the electrical junction box 1 to a great extent. Since the electrical junction box 1 according to the second embodiment is identical in structure with that described in connection with the first embodiment exclusive of the protuberance 23', repetition of its explanation is omitted here for brevity.

Although in the second embodiment the protuberance 23' is formed on the stepped wall 16' of the cover 2, the advantageous result identical with that yielded in the first embodiment would be yielded even if the protuberance 23' were formed on the flange wall 21' of the case 3. Further, although the embodiments have described a combination wherein the case 2 is to be closed by the upper case 3, the present invention can also be applied to an unillustrated electrical junction box comprising an upper cover, a case, and a lower cover. Even in the case of an electrical junction box not having the waterproof packing 19, a waterproof effect can be yielded by means of the secondary waterproof structure (materialized by the protuberance 23 and the second skirt wall 22).

As has been described above, according to a first aspect of the present invention, the protuberance is brought into strong pressing contact with the flange section or the stepped section through a small contact area. Even if the cover or case becomes warped, no clearance arises between the protuberance and the flange section or the stepped section, thus reliably preventing entry of water or dusts into the electrical junction box.

Further, according to a second aspect of the present invention, the protuberance is brought into line contact with the flange section or the stepped section, thus increasing the pressing force exerted on the flange section or the stepped section. Accordingly, the waterproof characteristic of the electrical junction box is improved greatly.

Moreover, according to a third aspect of the present invention, the clearance formed between the skirt walls is formed so as to be long. Hence, the force of high-pressure water is diminished within the clearance, thus diminishing the momentum of water hitting the protuberance. Therefore, the waterproof characteristic of the electrical junction box materialized by the protuberance is ensured to a much greater extent.

What is claimed is:

1. An electrical junction box, comprising:

a case body including a peripheral wall extending around the perimeter of the case body and a flange section extending outwardly from the peripheral wall, said case body defining a cavity therein;

a cover for covering the case body of said case body, said cover including a hood portion defining a recess therein and a stepped wall extending outwardly from said hood portion; and a waterproof packing disposed in said recess, said waterproof packing being separate from said case body including said flange section;

a curved protuberance provided on one of said flange section and said stepped wall, wherein when said cover is disposed on said case body, said peripheral wall contacts said waterproof packing acting as a firs seal and said protuberance abuts against another of said flange section and said stepped wall to form a line contact acting as a second seal, wherein said cover include a first skirt wall extending downwardly from said stepped wall and said case body includes a second skirt wall extending downwardly from said flange section, said first and second skirt walls defining a slot therebetween on the outside of said protuberance.

2. The junction electrical box of claim 1, wherein said protuberance has a circular cross-section.

3. The junction electrical box of claim 1, wherein said case body and said cover are made of synthetic resin.

* * * * *